(12) United States Patent
Ma et al.

(10) Patent No.: US 8,797,044 B2
(45) Date of Patent: Aug. 5, 2014

(54) MXM INTERFACE TEST SYSTEM AND CONNECTION APPARATUS THEREOF

(75) Inventors: You-Liang Ma, Shenzhen (CN); Bo Yang, Shenzhen (CN); Fa-Cun Li, Shenzhen (CN); Tai-Chen Wang, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 871 days.

(21) Appl. No.: 12/915,033

(22) Filed: Oct. 29, 2010

(65) Prior Publication Data

US 2012/0068720 A1  Mar. 22, 2012

(30) Foreign Application Priority Data

Sep. 21, 2010  (CN) .......................... 2010 1 0289190

(51) Int. Cl.
*G01R 31/26* (2014.01)
*G06F 11/22* (2006.01)

(52) U.S. Cl.
CPC .......... *G06F 11/221* (2013.01); *G06F 11/2284* (2013.01)

USPC ...................................... 324/538; 324/762.01

(58) Field of Classification Search
CPC ..................................................... G06F 11/221
See application file for complete search history.

(56) References Cited

U.S. PATENT DOCUMENTS

| | | | | |
|---|---|---|---|---|
| 6,441,627 | B1 * | 8/2002 | Larson .......................... | 324/538 |
| 6,842,865 | B2 * | 1/2005 | Nee et al. ....................... | 714/28 |
| 7,710,741 | B1 * | 5/2010 | Kelleher et al. ................ | 361/803 |
| 8,319,782 | B2 * | 11/2012 | Casparian et al. ............. | 345/505 |
| 2003/0057983 | A1 * | 3/2003 | Kim et al. ..................... | 324/755 |
| 2007/0101207 | A1 * | 5/2007 | Lin et al. ......................... | 714/56 |
| 2007/0294452 | A1 * | 12/2007 | Chiu et al. ..................... | 710/300 |
| 2010/0007668 | A1 * | 1/2010 | Casparian et al. ............. | 345/505 |
| 2011/0043989 | A1 * | 2/2011 | Tien et al. .................. | 361/679.4 |
| 2011/0130989 | A1 * | 6/2011 | Lu et al. .......................... | 702/66 |

* cited by examiner

*Primary Examiner* — Jermele M Hollington
(74) *Attorney, Agent, or Firm* — Novak Druce Connolly Bove + Quigg LLP

(57) ABSTRACT

A connection apparatus for connecting a mobile peripheral component interconnect express module (MXM) interface to a test apparatus includes a circuit board, a golden finger connector, and a group of signal test contacts. The test contacts are connected to the golden finger connector and configured for connection to the testing apparatus. When the circuit board is inserted into a MXM interface, the test contacts connect to the MXM interface.

6 Claims, 2 Drawing Sheets

MXM INTERFACE TEST SYSTEM AND CONNECTION APPARATUS THEREOF

BACKGROUND

1. Technical Field

The disclosure generally relates to test systems, particularly to a test system for testing mobile peripheral component interconnect express module (MXM) interface of a motherboard.

2. Description of Related Art

MXM is an interconnect standard for graphics processing units (GPU) or graphic cards in laptops using PCI Express. MXM interfaces are widely used on a motherboard for receiving the graphics card. To ensure performance of the graphics card, it is necessary to test characteristic of signals transmission of the MXM interface. A typical method to test the MXM interface is to solder a wire to pins of the MXM interface and output signals transmitted from the MXM interface to an oscilloscope by the wire. However, the motherboard may be easily damaged because of disoperation during soldering.

Therefore, there is room for improvement within the art.

BRIEF DESCRIPTION OF THE DRAWINGS

Many aspects of the MXM interface test system and connection apparatus thereof can be better understood with reference to the following drawings. The components in the drawings are not necessarily drawn to scale, the emphasis instead being placed upon clearly illustrating the principles of the MXM interface test system and connection apparatus thereof.

DETAILED DESCRIPTION

Figure 1:
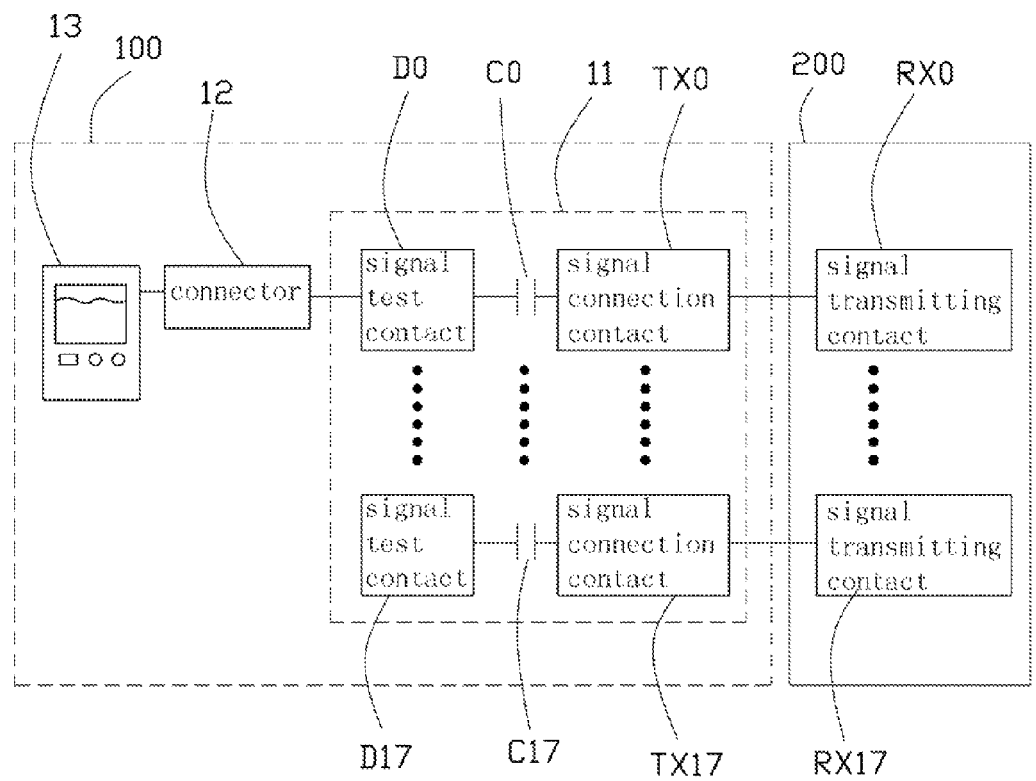
FIG. 1 shows a MXM interface test system used to test characteristics of signal transmission of a MXM interface, according to an exemplary embodiment.

FIG. 1 shows a MXM interface test system 100 used to test characteristics of signal transmission of a MXM interface 200, according to an exemplary embodiment. In this embodiment, the MXM interface 200 includes a group of signal transmitting contacts RX0-RX17 for data and clock signal transmission.

The MXM interface test system 100 includes a connection apparatus 11, at least one connector 12, and a test apparatus 13 connected in series.

Figure 2:
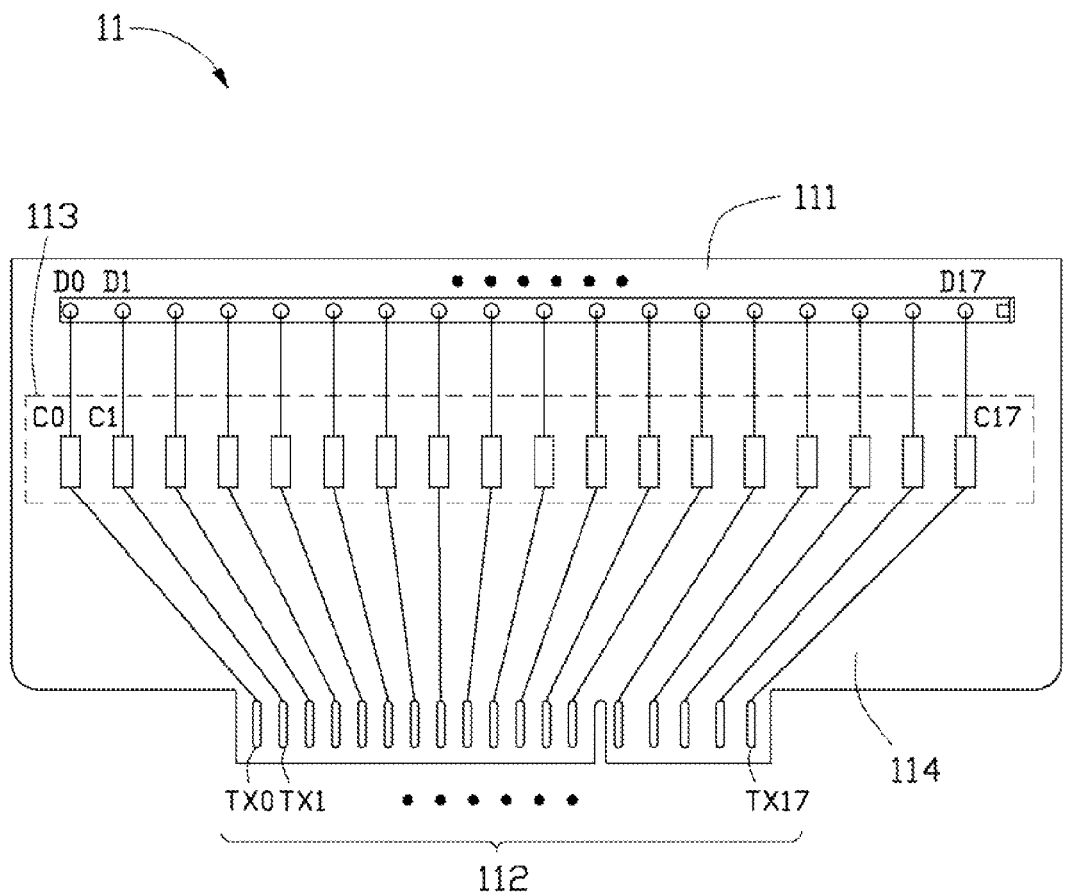
FIG. 2 is a schematic view of one embodiment of a connection apparatus of FIG. 1.

Referring to FIG. 2, the connection apparatus 11 includes a circuit board 111, a golden finger connector 112, a filter unit 113, and a group of signal test contacts D0-D17. The circuit board 111 can be inserted into the MXM interface 200. The golden finger connector 112 includes a group of signal connection contacts TX0-TX17 corresponding to the signal transmitting contacts RX0-RX15 of the MXM interface 200. When the circuit board is inserted into the MXM interface 200, the golden finger connector 112 connects to the MXM interface 200, and the signal connection contacts TX0-TX17 are connected to the signal transmitting contacts RX0-RX17.

The filter unit 113 includes a plurality of capacitors C0-C17. The capacitors C0-C17 are set between the signal connection contacts TX0-TX17 and the signal test contacts D0-D17 to decrease noises that may be generated therebetween. The signal test contacts D0-D17 are mounted on one side of the circuit board 111 opposite to the golden finger connector 112. Each test contacts D0-D17 are used to connect to the connectors 12.

The connector 12 can be a Sub-Miniature version A (SMA) connector. The test apparatus 13 can be an oscilloscope. The test apparatus 13 indicates signal transmission of the MXM interface 200. The test apparatus 13 connects to the test contacts D0-D17 by the connector 12.

During test, the connection apparatus 11 is inserted into the MXM interface 200. The signal transmitting contacts TX0-TX17 are connected to the corresponding signal connection contacts RX0-RX17. When signals transmitted from the MXM interface 200 are sent to the test apparatus 13 by the connection apparatus 11 and the connector 12. The characteristics of signal transmissions of MXM interface 200 can be determined according to the waveforms of these signals indicated by the test apparatus 13.

The test system 100 obtains the signal transmission of the MXM interface 200 by inserting the connection apparatus 11 thereto, and then sends the signals to the test apparatus 13. Therefore, there is no need to soldering any wires to the MXM interface 200, and can effectively avoid damage caused to the motherboard.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A connection apparatus for connecting a MXM interface to a testing apparatus; comprising:
    a circuit board;
    a golden finger connector, the golden finger connector comprising a group of signal connection contacts;
    a group of signal test contacts configured to connect the testing apparatus, the group of signal test contacts connected to the signal connection contacts of the golden finger connector; and
    a plurality of capacitors mounted between the signal connection contacts of the golden finger connector and the test contacts to decrease noises generated between the signal connection contacts and the test contacts; wherein when the circuit board is inserted into the MXM interface, the signal connection contacts are connected to the MXM interface, and the test contacts connect to the MXM interface via the signal connection contacts.

2. The connection apparatus as claimed in claim 1, wherein the MXM interface includes a group of signal transmitting contacts; the test contacts are connected to the signal transmitting contacts via the signal connection contacts when the circuit board is inserted into the MXM interface.

3. A test system for being used to test characteristic of signal transmission of a MXM interface, the test system comprising:
    a connection apparatus, comprising:
        a circuit board;
        a golden finger connector, the golden finger connector comprising a group of signal connection contacts; and
        a group of test contacts connected to the golden finger connector; and
        a set of capacitors mounted between the signal connection contacts of the golden finger connector and the test contacts to decrease noises generated between the signal connection contacts and the test contacts;

a test apparatus for indicating signal waveforms of the MXM interface connected to the test contacts; and at least one connector connecting the connection apparatus to the testing apparatus; wherein when the circuit board is inserted into the MXM interface, the signal connection contacts of the golden finger connector connect to the MXM interface.

4. The test system as claimed in claim 3, wherein the at least one connector is a Sub-Miniature version A connector.

5. The test system as claimed in claim 3, wherein the test apparatus is an oscilloscope.

6. The test system as claimed in claim 3, wherein the MXM interface includes a group of signal transmitting contacts; the test contacts are connected to the signal transmitting contacts via the signal connection contacts when the circuit board is inserted into the MXM interface.

* * * * *